United States Patent
Aimura

(10) Patent No.: US 12,179,744 B2
(45) Date of Patent: Dec. 31, 2024

(54) DRIVING SUPPORT DEVICE, DRIVING SUPPORT METHOD, AND STORAGE MEDIUM

(71) Applicant: HONDA MOTOR CO., LTD., Tokyo (JP)

(72) Inventor: Makoto Aimura, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 339 days.

(21) Appl. No.: 17/680,354

(22) Filed: Feb. 25, 2022

(65) Prior Publication Data

US 2022/0314973 A1 Oct. 6, 2022

(30) Foreign Application Priority Data

Mar. 30, 2021 (JP) .................................. 2021-057729

(51) Int. Cl.
*B60W 30/09* (2012.01)
*B60W 10/20* (2006.01)
*B60W 50/14* (2020.01)

(52) U.S. Cl.
CPC ............ *B60W 30/09* (2013.01); *B60W 10/20* (2013.01); *B60W 50/14* (2013.01);
(Continued)

(58) Field of Classification Search
CPC ...... B60W 30/09; B60W 10/20; B60W 50/14; B60W 2050/143; B60W 2420/403;
(Continued)

(56) References Cited

U.S. PATENT DOCUMENTS

| 2013/0148368 | A1* | 6/2013 | Foltin | .................... | B60Q 1/143 |
| | | | | | 362/465 |
| 2018/0182247 | A1* | 6/2018 | Baba | ...................... | G06V 20/58 |
| 2018/0362034 | A1 | 12/2018 | Hirata | | |

FOREIGN PATENT DOCUMENTS

| JP | 2009-140145 | 6/2009 |
| JP | 2011-258121 | 12/2011 |

(Continued)

OTHER PUBLICATIONS

Neumann, Lukáš, et al. "Nightowls: A pedestrians at night dataset." Computer Vision—ACCV 2018: 14th Asian Conference on Computer Vision, Perth, Australia, Dec. 2-6, 2018, Revised Selected Papers, Part I 14. Springer International Publishing, 2019. (Year: 2019).*

(Continued)

*Primary Examiner* — Russell Frejd
*Assistant Examiner* — Ana D Thomas
(74) *Attorney, Agent, or Firm* — Amin, Turocy & Watson, LLP

(57) ABSTRACT

A driving support device includes a detector configured to detect an obstacle in front of a host vehicle, and a processor configured to calculate the likelihood of collision between the obstacle and the host vehicle and to perform at least one of alarm control and travel control when the likelihood is equal to or higher than a predetermined value. When the obstacle has been detected between the host vehicle and an oncoming vehicle with respect to the host vehicle, the processor brings forward the timing to start at least one of the alarm control and the travel control as compared to a case where the obstacle has not been detected between the host vehicle and the oncoming vehicle.

7 Claims, 4 Drawing Sheets

(52) U.S. Cl.
CPC . *B60W 2050/143* (2013.01); *B60W 2420/403* (2013.01); *B60W 2420/408* (2024.01); *B60W 2554/4029* (2020.02); *B60W 2554/4044* (2020.02); *B60W 2710/20* (2013.01); *B60W 2720/10* (2013.01)

(58) Field of Classification Search
CPC ... B60W 2420/408; B60W 2554/4029; B60W 2554/4044; B60W 2710/20; B60W 2720/10; B60W 30/08
See application file for complete search history.

(56) References Cited

FOREIGN PATENT DOCUMENTS

| | | |
|---|---|---|
| JP | 2012-155376 | 8/2012 |
| JP | 2012-229948 | 11/2012 |
| JP | 2020-199962 | 12/2020 |
| WO | 2017/126012 | 7/2017 |

OTHER PUBLICATIONS

Japanese Office Action for Japanese Patent Application No. 2021-057729 mailed Dec. 20, 2022.

\* cited by examiner

DRIVING SUPPORT DEVICE, DRIVING SUPPORT METHOD, AND STORAGE MEDIUM

CROSS-REFERENCE TO RELATED APPLICATION

This application is based upon and claims the benefit of priority from Japanese Patent Application No. 2021-057729, Mar. 30, 2021, the entire contents of which are incorporated herein by reference.

BACKGROUND

Field of the Invention

The present invention relates to a driving support device, a driving support method, and a storage medium.

Description of Related Art

In the related art, there is a technology for detecting a pedestrian around a vehicle on the basis of information obtained by a camera and a radar device and controlling a brake of the vehicle in order to avoid contact with the pedestrian (for example, see PCT International Publication No. WO 2017/126012).

SUMMARY

When a pedestrian is detected using a camera and a radar device, there are times when a pedestrian may be present between a host vehicle and an oncoming vehicle at night. Under such a situation, the recognition of the pedestrian based on a video captured by the camera may be delayed due to an influence of light from the headlight of the oncoming vehicle and driving support such as brake control may be delayed.

The present invention is achieved in view of the problems described above, and one object of the present invention is to provide a driving support device, a driving support method, and a storage medium, by which it is possible to suppress a delay in driving support.

A driving support device, a driving support method, and a storage medium according to the invention adopt the following configurations.

(1) A first aspect of the invention is a driving support device including: a detector including at least one of a radar device and an LIDAR and an optical sensor and configured to detect an obstacle in front of a host vehicle; and a processor configured to calculate a likelihood of collision between the obstacle detected by the detector and the host vehicle, and to perform at least one of alarm control and travel control when the likelihood is equal to or higher than a predetermined value. The alarm control is a driving support that outputs an alarm to an occupant of the host vehicle, and the travel control is a driving support that controls at least one of speed and steering of the host vehicle. When the obstacle has been detected between the host vehicle and an oncoming vehicle with respect to the host vehicle, the processor brings forward a timing to start at least one of the alarm control and the travel control as compared to a case where the obstacle has not been detected between the host vehicle and the oncoming vehicle.

(2) According to a second aspect of the invention, in the above first aspect, when the host vehicle has turned on headlights, the processor further brings forward the timing as compared to a case where the host vehicle has not turned on the headlights, or when the illuminance around the host vehicle is smaller than a predetermined illuminance, the processor further brings forward the timing as compared to a case where the illuminance around the host vehicle is equal to or higher than the predetermined illuminance.

(3) According to a third aspect of the invention, in the above first aspect or second aspect, when a reflection intensity of a first echo, which is an electromagnetic wave transmitted from the detector and reflected by the oncoming vehicle, is higher than a reflection intensity of a second echo that is the electromagnetic wave transmitted from the detector and reflected by the obstacle, the processor further brings forward the timing as compared to a case where the reflection intensity of the first echo is equal to or less than the reflection intensity of the second echo.

(4) According to a fourth aspect of the invention, in any one of the above first aspect to third aspect, when a micro-Doppler signal has been detected by the detector, the processor further brings forward the timing as compared to a case where the micro-Doppler signal has not been detected.

(5) According to a fifth aspect of the invention, in any one of the above first aspect to fourth aspect, when headlights of the host vehicle and the oncoming vehicle have been turned on, the processor further brings forward the timing as compared to a case where the headlights of the host vehicle and the oncoming vehicle have not been turned on.

(6) A sixth aspect of the invention is a driving support method performed by a computer installed in a vehicle including a detector including at least one of a radar device and an LIDAR and an optical sensor and configured to detect an obstacle in front of a host vehicle and including the steps of: calculating a likelihood of collision between the obstacle detected by the detector and the host vehicle; performing at least one of alarm control and travel control when the likelihood is equal to or higher than a predetermined value, the alarm control being a driving support that outputs an alarm to an occupant of the host vehicle, the travel control being a driving support that controls at least one of speed and steering of the host vehicle; and when the obstacle has been detected between the host vehicle and an oncoming vehicle with respect to the host vehicle, advancing a timing to start at least one of the alarm control and the travel control as compared to a case where the obstacle has not been detected between the host vehicle and the oncoming vehicle.

(7) A seventh aspect of the invention is a non-transitory computer readable storage medium storing a program causing a computer, which is installed in a vehicle including a detector including at least one of a radar device and an LIDAR and an optical sensor and configured to detect an obstacle in front of a host vehicle, to perform: calculating a likelihood of collision between the obstacle detected by the detector and the host vehicle; performing at least one of alarm control and travel control when the likelihood is equal to or higher than a predetermined value, the alarm control being a driving support that outputs an alarm to an occupant of the host vehicle, the travel control being a driving support that controls at least one of speed and steering of the host vehicle; and when the obstacle has been detected between the host vehicle and an oncoming vehicle with respect to the host vehicle, advancing a timing to start at least one of the alarm control and the travel control as compared to a case where the obstacle has not been detected between the host vehicle and the oncoming vehicle.

According to the above aspect, it is possible to suppress delay in driving support.

DESCRIPTION OF EMBODIMENTS

Hereinafter, an embodiment of a driving support device, a driving support method, and a storage medium of the present invention will be described with reference to the drawings.

Figure 1:
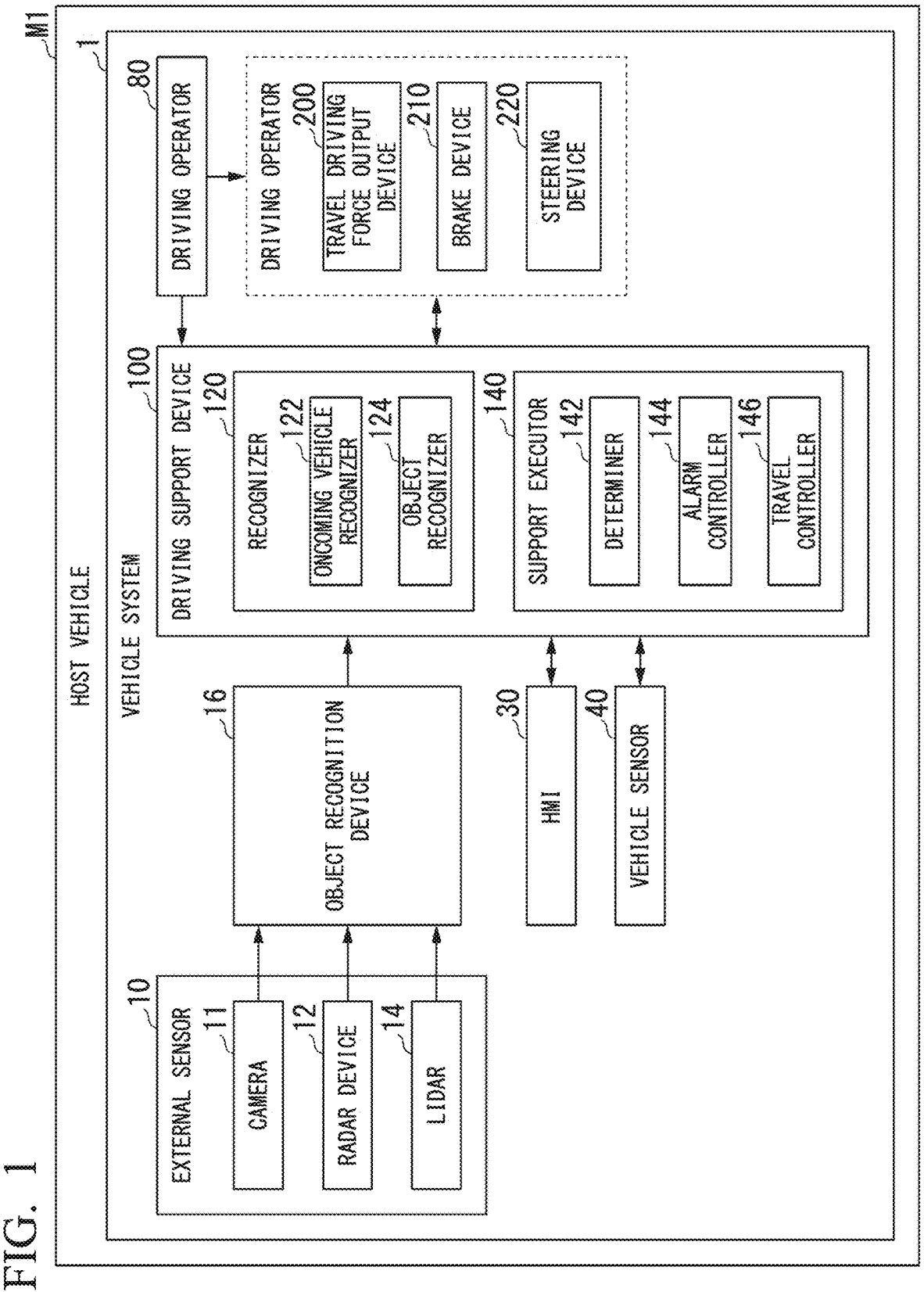
FIG. 1 is a configuration diagram of a vehicle system using a driving support device according to an embodiment.

A driving support device of an embodiment will be described. FIG. 1 is a configuration diagram of a vehicle system 1 using a driving support device according to an embodiment. A vehicle, in which the vehicle system 1 is installed, has two wheels, three wheels, four wheels, or the like, for example, and its driving source is an internal combustion engine such as a diesel engine and a gasoline engine, an electric motor, or a combination thereof. The electric motor operates by using power generated by a generator connected to the internal combustion engine or power discharged from a secondary cell or a fuel cell. In the following description, a vehicle, in which the vehicle system 1 is installed, is referred to as a host vehicle M1.

The vehicle system 1 includes, for example, an external sensor 10, an object recognition device 16, a human machine interface (HMI) 30, a vehicle sensor 40, a driving operator 80, a driving support device 100, a travel driving force output device 200, a brake device 210, and a steering device 220. These devices and equipment are connected to one another via a multiplex communication line such as a controller area network (CAN) communication line, a serial communication line, a wireless communication network, and the like. The configuration shown in FIG. 1 is merely an example, and part of the configuration may be omitted or other configurations may be added.

The external sensor 10 acquires information on the exterior of the host vehicle M1. The external sensor 10 includes a camera 11, a radar device 12, and a light detection and ranging (LIDAR) 14. The camera 11 is, for example, a digital camera using a solid-state imaging element such as a charge coupled device (CCD) and a complementary metal oxide semiconductor (CMOS). The camera 11 is mounted at arbitrary places on the host vehicle M1. In the case of capturing an image of an area in front of the host vehicle M1, the camera 11 is mounted on an upper part of a front windshield, on a rear surface of a rear-view mirror, and the like. The camera 11, for example, periodically and repeatedly captures the surroundings of the host vehicle M1. The camera 11 may be a stereo camera. The camera 11 is an example of an optical sensor.

The radar device 12 emits (transmits) radio waves such as millimeter waves to the surroundings of the host vehicle M1, detects radio waves (reflected waves) reflected by an object and detects at least a position (a distance and an orientation) of the object. The radar device 12 is mounted at arbitrary places on the host vehicle M1. The radio wave transmitted by the radar device 12 is an example of a transmitted wave. The radar device 12 may detect the position and the speed of the object by a frequency modulated continuous wave (FM-CW) scheme.

The LIDAR 14 emits light (or electromagnetic waves having a wavelength close to that of light) to the surroundings of the host vehicle M1 and measures scattered light. The LIDAR 14 detects a distance to a target on the basis of a time from light emission to light reception. The emitted light is, for example, a pulsed laser beam. The LIDAR 14 is mounted at arbitrary places on the host vehicle M1.

The HMI 30 is an alarm device (notification device) that presents various information to an occupant of the host vehicle M1. Furthermore, the HMI 30 receives an input operation of the occupant. The HMI 30 includes various display devices, speakers, buzzers, touch panels, switches, keys, and the like.

The vehicle sensor 40 is a sensor that detects information on a traveling state of the host vehicle M1 used in driving support and the like. The vehicle sensor 40 includes a vehicle speed sensor that detects the speed of the host vehicle M1, an acceleration sensor that detects acceleration, a yaw rate sensor that detects an angular velocity around a vertical axis, a direction sensor that detects the orientation of the host vehicle M1, an illuminance sensor that detects the brightness of the surroundings of the host vehicle M1, and the like.

The driving operator 80 is an operator operated by a driver in order to drive the host vehicle M1. The driving operator 80 is provided, for example, in the vicinity of a driver's seat in which a driver sits. The driving operator 80 includes, for example, an accelerator pedal, a brake pedal, a shift lever, steering wheel, a deformed steer, a joy stick, a headlight switch, and other operators.

The driving support device 100 includes a recognizer 120 and a support executor 140. Each of the recognizer 120 and the support executor 140 is implemented by, for example, a hardware processor such as a central processing unit (CPU) executing a program (software). Some or all of these components may be implemented by hardware (a circuit unit: including circuitry) such as a large-scale integration (LSI), an application specific integrated circuit (ASIC), a field-programmable gate array (FPGA), and a graphics processing unit (GPU), or may be implemented by software and hardware in cooperation. The program may be stored in advance in a storage device (storage device including a non-transitory storage medium) such as an HDD and a flash memory of the driving support device 100, or may be installed in the HDD and the flash memory of the driving support device 100 when a detachable storage medium (non-transitory storage medium) storing the program, such as a DVD and a CD-ROM, is mounted on a drive device.

The recognizer 120, for example, implements an artificial intelligence (AI)-based function and a prescribed model-based function in parallel. The recognizer 120 includes an oncoming vehicle recognizer 122 and an object recognizer 124. The oncoming vehicle recognizer 122 recognizes an oncoming vehicle, which faces the host vehicle, on the basis of the reflection intensity of the radio waves reflected by the oncoming vehicle with respect to the host vehicle M1 after being emitted by the radar device 12. The object recognizer 124 recognizes an object in the surroundings including the front of the host vehicle on the basis of the reflection intensity of the radio waves reflected by the object after being emitted by the radar device 12. The object is an example of an obstacle.

The oncoming vehicle recognizer 122 performs, for example, oncoming vehicle recognition based on deep learning and the like and oncoming vehicle recognition based on pattern matching in parallel, and comprehensively evaluates the recognition results of both recognitions, thereby recognizing an oncoming vehicle. Furthermore, the oncoming vehicle recognizer 122 may perform, for example, oncoming vehicle recognition based on deep learning and the like and recognition based on prescribed conditions (there are pattern-matchable signals, road markings, and the like) in parallel, score both recognitions, and comprehensively evaluate the scoring results. The oncoming vehicle recognizer 122 may recognize whether the oncoming vehicle has turned on headlights.

The object recognizer 124 recognizes a crossing object by, for example, deep learning, pattern matching, and the like in which a vehicle in the oncoming vehicle recognizer 122 is replaced with an object. The object recognizer 124 recognizes, for example, an object crossing a road as a crossing object. When the oncoming vehicle recognizer 122 has recognized the oncoming vehicle, the object recognizer 124 further recognizes a crossing object between the oncoming vehicle and the host vehicle M1. The object includes a pedestrian. The object may be a non-moving object.

The object recognizer 124 may recognize a person other than a person who walks, for example, a person who rides a bicycle or a kickboard as a pedestrian. The object recognizer 124 may recognize an animal and the like other than a human as a pedestrian. The object recognizer 124 may recognize an object other than an object crossing a road, for example, an object that approaches the host vehicle M1 or moves away from the host vehicle M1. The recognizer 120 may perform one of AI-based image recognition and a prescribed model-based image recognition.

The support executor 140 includes a determiner 142, an alarm controller 144, and a travel controller 146. The determiner 142 calculates a distance between the crossing object recognized by the recognizer 120 and the host vehicle M1. On the basis of the calculated distance between the crossing object and the host vehicle M1, the determiner 142 calculates the likelihood of collision between the crossing object and the host vehicle M1 (that is, the probability of collision between the crossing object and the host vehicle M1).

The determiner 142 determines whether the reflection intensity (hereinafter, oncoming vehicle reflection intensity) of the radio waves reflected by the oncoming vehicle after being emitted by the radar device 12 is higher than the reflection intensity (hereinafter, object reflection intensity) of the radio waves reflected by the crossing object. When reflected waves used when the object recognizer 124 recognizes the crossing object are detected by the radar device 12, the determiner 142 determines whether the radar device 12 has detected a micro-Doppler signal. The micro-Doppler signal is a signal having a frequency longer than a predetermined value among Doppler signals that are signals having a frequency proportional to a moving speed of a crossing object to be measured.

The alarm controller 144 provides driving support by alarm control that gives an alarm toward an occupant. The alarm control is, for example, forward collision warning (FCW). The alarm controller 144 controls the HMI 30 to give an alarm to an occupant of the host vehicle M1 when the likelihood of collision calculated by the determiner 142 is equal to or higher than a first predetermined value. For example, when a crossing object exists in front of the host vehicle M1 and there is a possibility of collision with the crossing object, the alarm controller 144 controls the HMI 30 to give an alarm to notify the occupant of the host vehicle M1 that there is a possibility of collision with the crossing object.

The alarm controller 144 may set time to collision (hereinafter, TTC) until the recognizer 120 gives an alarm after recognizing the crossing object, in a plurality of stages, for example, three stages. The TTC is set to a first stage with the shortest time, a second stage with the second shortest time, or a third stage with the longest time. The occupant may set the TTC in the alarm controller 144 according to his/her preference by, for example, operating a TTC stage setting switch.

The travel controller 146 provides driving support by controlling the travel of the host vehicle M1. The travel control is, for example, controlling one or both of the speed and steering of the host vehicle M1. The travel control is, for example, a collision damage mitigation brake (automatic emergency brake (AEB)). The travel controller 146 controls the brake device 210 on the basis of the recognition result of the recognizer 120 and the detection result of the vehicle sensor 40.

For example, the travel controller 146 controls the brake device 210 when the likelihood of collision calculated by the determiner 142 is, for example, equal to or higher than a second predetermined value. For example, when a crossing object exists in front of the host vehicle M1, the travel controller 146 controls the travel of the host vehicle M1 so as to avoid contact between the host vehicle M1 and the crossing object. The second predetermined value is a value greater than the first predetermined value. The second predetermined value may be the same numerical value as the first predetermined value.

The travel driving force output device 200 outputs a travel driving force (torque) for driving the vehicle to driving wheels. The travel driving force output device 200 includes, for example, a combination of an internal combustion engine, an electric motor, a transmission and the like, and an electronic controller (ECU) for controlling them. The ECU controls the above configuration according to information input from the travel controller 146 or information input from the driving operator 80.

The brake device 210 includes, for example, a brake caliper, a cylinder for transferring hydraulic pressure to the brake caliper, an electric motor for generating the hydraulic pressure in the cylinder, and a brake ECU. The brake ECU controls the electric motor according to the information input from the travel controller 146 or the information input from the driving operator 80, thereby allowing a brake torque corresponding to a brake operation to be output to each wheel.

The brake device 210 may have a backup mechanism for transferring the hydraulic pressure generated by an operation of the brake pedal included in the driving operator 80 to the cylinder via a master cylinder. The brake device 210 is not limited to the aforementioned configuration and may be an electronically controlled hydraulic pressure brake device that controls an actuator according to the information input from the travel controller 146, thereby transferring the hydraulic pressure of the master cylinder to the cylinder.

The steering device 220 includes, for example, a steering ECU and an electric motor. The electric motor, for example, changes an orientation of a steering wheel by allowing a force to act on a rack and pinion mechanism. The steering ECU drives the electric motor according to the information input from the travel controller 146 or the information input from the driving operator 80, thereby changing the orientation of the steering wheel.

Figure 2:
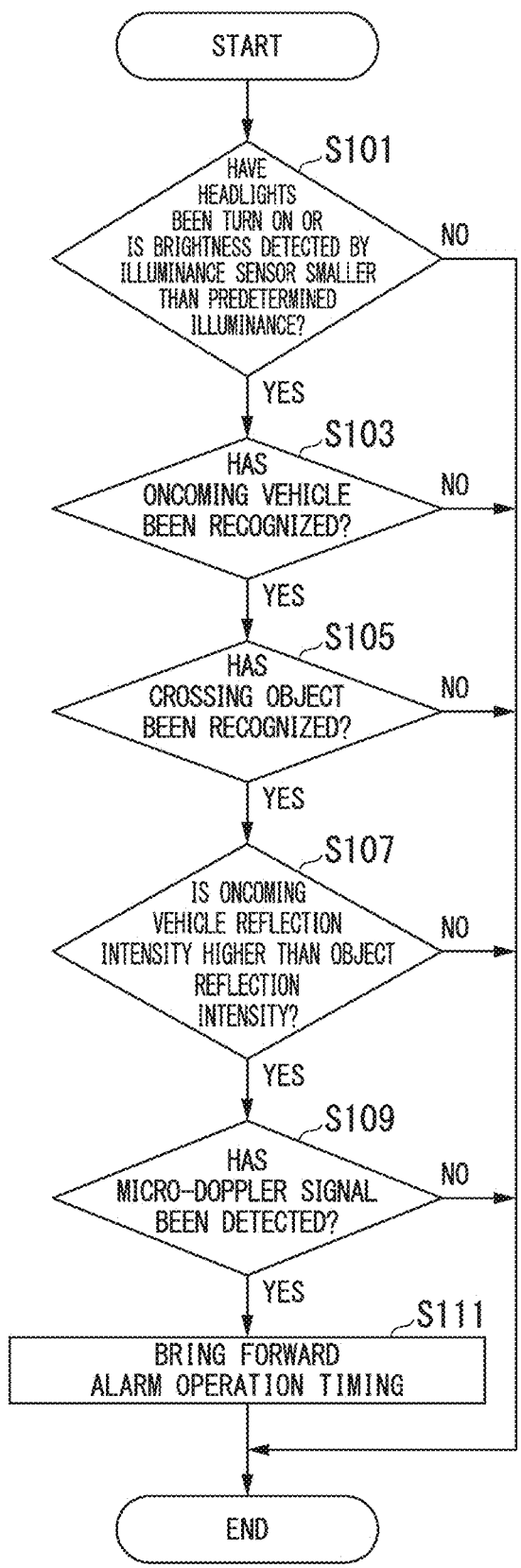
FIG. 2 is a flowchart showing an example of processing performed by the driving support device.

Next, processing in the driving support device 100 will be described. FIG. 2 is a flowchart showing an example of processing performed by the driving support device 100. First, the driving support device 100 determines whether either whether the host vehicle M1 has turned on the headlights or whether the brightness of the surroundings of the host vehicle M1 detected by the illuminance sensor is smaller than a predetermined illuminance is satisfied in the support executor 140 (step S101). The driving support device 100 determines whether the surroundings of the host vehicle M1 are substantially dark, by the determination in step S101.

When it is determined that the host vehicle M1 has not turned on the headlights or the brightness of the surroundings of the host vehicle M1 detected by the illuminance sensor is not smaller than the predetermined illuminance, the driving support device 100 ends the processing shown in FIG. 2. When it is determined that the host vehicle M1 has turned on the headlights or the brightness of the surroundings of the host vehicle M1 detected by the illuminance sensor is smaller than the predetermined illuminance, the recognizer 120 determines whether the oncoming vehicle recognizer 122 has recognized an oncoming vehicle (step S103).

When it is determined that the oncoming vehicle recognizer 122 has not recognized the oncoming vehicle, the driving support device 100 ends the processing shown in FIG. 2. When it is determined that the oncoming vehicle recognizer 122 has recognized the oncoming vehicle, the recognizer 120 determines whether the object recognizer 124 has recognized a crossing object (step S105). When it is determined that the object recognizer 124 has not recognized the crossing object, the driving support device 100 ends the processing shown in FIG. 2.

When it is determined that the object recognizer 124 has recognized the crossing object, the determiner 142 determines whether an oncoming vehicle reflection intensity is higher than an object reflection intensity (step S107). When the determiner 142 determines that the oncoming vehicle reflection intensity is not higher than the object reflection intensity, the driving support device 100 ends the processing shown in FIG. 2.

When the determiner 142 determines that the oncoming vehicle reflection intensity is higher than the object reflection intensity, the determiner 142 determines whether a micro-Doppler signal has been detected by the radar device 12 (step S109). When the determiner 142 determines that the micro-Doppler signal has not been detected by the radar device 12, the driving support device 100 ends the processing shown in FIG. 2.

When it is determined that the micro-Doppler signal has been detected by the radar device 12, the alarm controller 144 brings forward the start timing of control for causing the HMI 30 to give an alarm (step S111). In other words, in case that that the micro-Doppler signal has been detected (the obstacle has been detected), the alarm controller 144 starts at least one of the alarm control and the travel control earlier than in case that the micro-Doppler signal has not been detected (the obstacle has not been detected). In order to bring forward the start timing of the alarm, the alarm controller 144 raises the setting stage of the set TTC by one stage. For example, when the setting stage of the TTC is set to the second stage, the alarm controller 144 raises the setting stage of the TTC to the first stage.

Therefore, when the illuminance around the host vehicle M1 is smaller than the predetermined illuminance, the driving support device 100 brings forward the start timing to start at least one of the alarm control and the travel control as compared to a case where the illuminance around the host vehicle M1 is equal to or higher than the predetermined illuminance. Moreover, when the oncoming vehicle reflection intensity is higher than the crossing object reflection intensity, the driving support device 100 brings forward the start timing to start at least one of the alarm control and the travel control as compared to a case where the oncoming vehicle reflection intensity is equal to or less than the crossing object reflection intensity. Moreover, when the micro-Doppler signal has been detected by the radar device 12, the driving support device 100 brings forward the start timing to start at least one of the alarm control and the travel control as compared to a case where the micro-Doppler signal has not been detected by the radar device 12. By so doing, the driving support device 100 ends the processing shown in FIG. 2.

Figure 3:
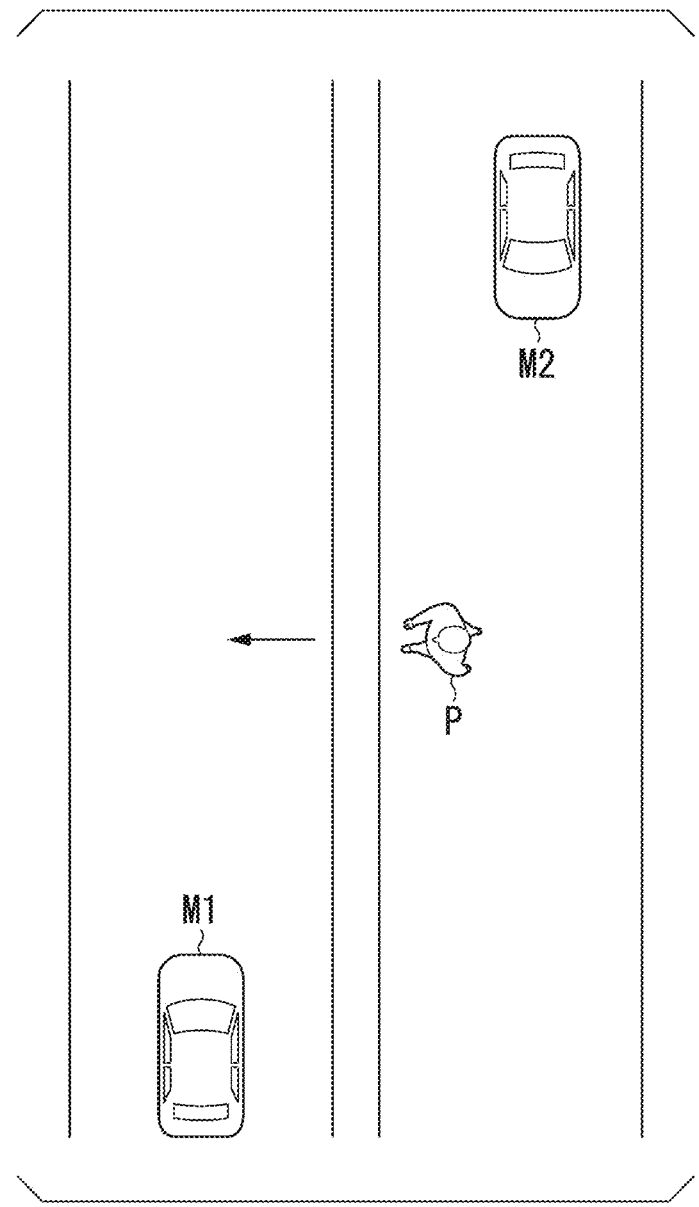
FIG. 3 is a diagram showing an example of the positional relationship among a host vehicle, an oncoming vehicle, and a crossing object.
Figure 4:
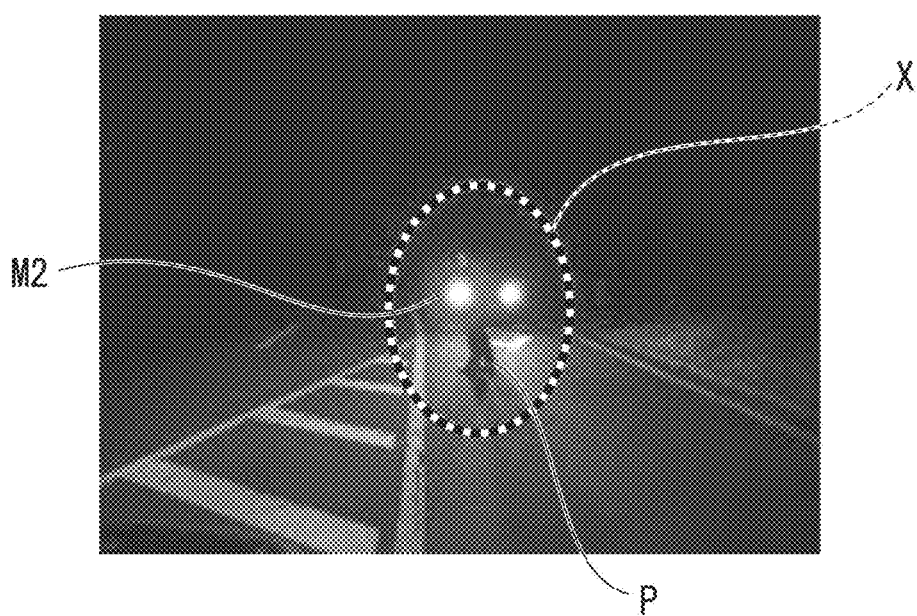
FIG. 4 is a diagram showing the oncoming vehicle and the crossing object viewed from the host vehicle in the situation of FIG. 3.

FIG. 3 is a diagram showing an example of the positional relationships between the host vehicle M1, an oncoming vehicle M2, and a crossing object P, and FIG. 4 is a diagram showing the oncoming vehicle M2 and the crossing object P viewed from the host vehicle M1 in the situation of FIG. 3. For example, when the crossing object P exists in front of the host vehicle M1, the driving support device 100 calculates the likelihood of collision between the host vehicle M1 and the crossing object P and performs the alarm control and the travel control according to the likelihood of collision.

When the crossing object P is moving in front of the host vehicle M1, for example, when the crossing object P is crossing, the light of the headlights of the host vehicle M1 and the light of the headlights of the crossing object P may intersect with each other, which may lead to an evaporation phenomenon in which the crossing object P becomes difficult to be seen as indicated by an area X in FIG. 4. When the evaporation phenomenon occurs, it is thought that the recognition of the crossing object P by the recognizer 120 may be delayed and thus alarm and driving support by the support executor 140 may be delayed.

In this regard, when the crossing object P has been detected between the host vehicle M1 and the oncoming vehicle M2, the driving support device 100 of an embodiment brings forward the start timing to start the control by the alarm controller 144 as compared to a case where the crossing object P has not been detected between the host vehicle M1 and the oncoming vehicle M2. Therefore, even in a situation where the recognition of an obstacle such as the crossing object P is delayed, it is possible to suppress delay in the driving support.

In the above embodiment, the driving support device 100 brings forward the start timing of the alarm control when the likelihood of collision calculated by the determiner 142 is equal to or higher than the first predetermined value and brings forward the start timing of the travel control when the likelihood of collision calculated by the determiner 142 is equal to or higher than the second predetermined value. On the other hand, the driving support device 100 may bring forward only the start timing of the alarm control or may bring forward only the start timing of the travel control.

In the above embodiment, the driving support device 100 brings forward the start timing of the driving support when a crossing object has been recognized; however, the driving support device 100 may bring forward the start timing of the driving support when an object other than a crossing object has been recognized. In the above embodiment, the driving support device 100 brings forward the start timing of the driving support when the surroundings of the host vehicle M1 are dark; however, the driving support device 100 may bring forward the start timing of the driving support regardless of whether the surroundings of the host vehicle M1 are dark.

Moreover, when the oncoming vehicle reflection intensity is not higher than the object reflection intensity and when the radar device 12 has not received the micro-Doppler signal, the driving support device 100 may bring forward the start timing of the driving support. Alternatively, when the headlights of both the host vehicle M1 and the oncoming vehicle M2 have been turned on, the driving support device 100 may bring forward the start timing of the driving support.

The aforementioned embodiment can be represented as follows.

A driving support device includes a storage device that stores a program and a hardware processor, and the hardware processor executes the program stored in the storage device, so that the driving support device recognizes an obstacle in front of a host vehicle on the basis of a detection result of a detector that includes at least one of a radar device and a LIDAR and an optical sensor and detects an obstacle in front of the host vehicle, performs at least one of alarm control and travel control when the likelihood of collision with the obstacle detected by the detector is equal to or higher than a predetermined value, and when the obstacle has been detected between the host vehicle and an oncoming vehicle with respect to the host vehicle, brings forward the start timing to start at least one of the alarm control and the travel control as compared to a case where the obstacle has not been detected between the host vehicle and the oncoming vehicle.

Furthermore, the aforementioned embodiment can be represented as follows.

SUPPLEMENTARY NOTE 1

A driving support device including a recognizer that recognizes an obstacle in front of a host vehicle on the basis of a detection result of detection means that includes at least one of a radar device and an LIDAR and optical means and detects an obstacle in front of the host vehicle, and a support executor that performs at least one of alarm control and travel control when the likelihood of collision with the obstacle detected by the detection means is equal to or higher than a predetermined value, and when the obstacle has been detected between the host vehicle and an oncoming vehicle with respect to the host vehicle, the support executor brings forward the start timing to start at least one of the alarm control and the travel control as compared to a case where the obstacle has not been detected between the host vehicle and the oncoming vehicle.

SUPPLEMENTARY NOTE 2

In the case of satisfying at least one of when the host vehicle has turned on headlights and an illuminance around the host vehicle is smaller than a predetermined illuminance, the support executor may further bring forward the start timing to start at least one of the alarm control and the travel control as compared to a case where the illuminance around the host vehicle is equal to or higher than the predetermined illuminance.

SUPPLEMENTARY NOTE 3

When the reflection intensity of reflected waves after transmitted waves transmitted by the detection means are reflected by the oncoming vehicle is higher than that of reflected waves after the transmitted waves are reflected by the obstacle, the support executor may further bring forward the start timing to start at least one of the alarm control and the travel control as compared to a case where the reflection intensity of the reflected waves reflected by the oncoming vehicle is equal to or less than that of reflected waves reflected by the obstacle.

SUPPLEMENTARY NOTE 4

When a micro-Doppler signal has been detected by the detection means, the support executor may further bring forward the start timing to start at least one of the alarm control and the travel control as compared to a case where the micro-Doppler signal has not been detected.

SUPPLEMENTARY NOTE 5

When the headlights of the host vehicle and the oncoming vehicle have been turned on, the support executor may further bring forward the start timing to start at least one of the alarm control and the travel control as compared to a case where the headlights of the host vehicle and the oncoming vehicle have not been turned on.

SUPPLEMENTARY NOTE 6

A driving support method in which a computer of a driving support device recognizes an obstacle in front of a host vehicle on the basis of a detection result of detection means that includes at least one of a radar device and an LIDAR and optical means and detects an obstacle in front of the host vehicle, performs at least one of alarm control and travel control when the likelihood of collision with the obstacle detected by the detection means is equal to or higher than a predetermined value, and when the obstacle has been detected between the host vehicle and an oncoming vehicle with respect to the host vehicle, brings forward the start timing to start at least one of the alarm control and the travel control as compared to a case where the obstacle has not been detected between the host vehicle and the oncoming vehicle.

SUPPLEMENTARY NOTE 7

A program causing a computer of a driving support device to recognize an obstacle in front of a host vehicle on the basis of a detection result of detection means that includes at least one of a radar device and an LIDAR and optical means and detects an obstacle in front of the host vehicle, and to perform at least one of alarm control and travel control when the likelihood of collision with the obstacle detected by the detection means is equal to or higher than a predetermined value, and when the obstacle has been detected between the host vehicle and an oncoming vehicle with respect to the host vehicle, to bring forward the start timing to start at least one of the alarm control and the travel control as compared to a case where the obstacle has not been detected between the host vehicle and the oncoming vehicle.

Although a mode for carrying out the present invention has been described using the embodiments, the present invention is not limited to these embodiments and various modifications and substitutions can be made without departing from the spirit of the present invention.

What is claimed is:

1. A driving support device comprising:
a detector comprising at least one of a radar device and an LIDAR and an optical sensor and configured to detect an obstacle in front of a host vehicle; and
a processor configured to calculate a likelihood of collision between the obstacle detected by the detector when surroundings of the host vehicle are dark and the host vehicle, and to perform at least one of alarm control and travel control when the likelihood is equal to or higher than a predetermined value,
wherein the alarm control is a driving support that outputs an alarm to an occupant of the host vehicle, and the travel control is a driving support that controls at least one of speed and steering of the host vehicle, and
when the obstacle has been detected in front of the host vehicle and an oncoming vehicle with respect to the host vehicle has been detected, the processor advances a timing to start at least one of the alarm control and the travel control as compared to a case where the obstacle has been detected in front of the host vehicle and the oncoming vehicle has not been detected.

2. The driving support device according to claim 1, wherein, when the host vehicle has turned on headlights, the processor further advances the timing as compared to a case where the host vehicle has not turned on the headlights, or
when an illuminance around the host vehicle is smaller than a predetermined illuminance, the processor further advances the timing as compared to a case where the illuminance around the host vehicle is equal to or higher than the predetermined illuminance.

3. The driving support device according to claim 1, wherein, when a reflection intensity of a first echo, which is an electromagnetic wave transmitted from the detector and reflected by the oncoming vehicle, is higher than a reflection intensity of a second echo that is the electromagnetic wave transmitted from the detector and reflected by the obstacle, the processor further advances the timing as compared to a case where the reflection intensity of the first echo is equal to or less than the reflection intensity of the second echo.

4. The driving support device according to claim 1, wherein, when a micro-Doppler signal has been detected by the detector, the processor further advances the timing as compared to a case where the micro-Doppler signal has not been detected.

5. The driving support device according to claim 1, wherein, when headlights of the host vehicle and the oncoming vehicle have been turned on, the processor further advances the timing as compared to a case where the headlights of the host vehicle and the oncoming vehicle have not been turned on.

6. A driving support method performed by a computer installed in a vehicle comprising a detector comprising at least one of a radar device and an LIDAR and an optical sensor and configured to detect an obstacle in front of a host vehicle, the driving support method comprising the steps of:
calculating a likelihood of collision between the obstacle detected by the detector and the host vehicle when surroundings of the host vehicle are dark;
performing at least one of alarm control and travel control when the likelihood is equal to or higher than a predetermined value, the alarm control being a driving support that outputs an alarm to an occupant of the host vehicle, the travel control being a driving support that controls at least one of speed and steering of the host vehicle; and
when the obstacle has been detected in front of the host vehicle and an oncoming vehicle with respect to the host vehicle has been detected, advancing a timing to start at least one of the alarm control and the travel control as compared to a case where the obstacle has been detected in front of the host vehicle and the oncoming vehicle has not been detected.

7. A non-transitory computer readable storage medium storing a program causing a computer, which is installed in a vehicle having a detector including at least one of a radar device and an LIDAR and an optical sensor and configured to detect an obstacle in front of a host vehicle, to perform:
calculating a likelihood of collision between the obstacle detected by the detector and the host vehicle when surroundings of the host vehicle are dark;
performing at least one of alarm control and travel control when the likelihood is equal to or higher than a predetermined value, the alarm control being a driving support that outputs an alarm to an occupant of the host vehicle, the travel control being a driving support that controls at least one of speed and steering of the host vehicle; and
when the obstacle has been detected in front of the host vehicle and an oncoming vehicle with respect to the host vehicle has been detected, advancing a timing to start at least one of the alarm control and the travel control as compared to a case where the obstacle has been detected in front of the host vehicle and the oncoming vehicle has not been detected.

* * * * *